US008140127B2

(12) United States Patent
Luo

(10) Patent No.: US 8,140,127 B2
(45) Date of Patent: Mar. 20, 2012

(54) SYSTEM AND METHOD FOR CONTROLLING NOTIFICATION CHARACTERISTICS OF A MOBILE COMMUNICATION DEVICE

(75) Inventor: Hui Luo, Marlboro, NJ (US)

(73) Assignee: Broadcom Corporation, Irvine, CA (US)

( * ) Notice: Subject to any disclaimer, the term of this patent is extended or adjusted under 35 U.S.C. 154(b) by 671 days.

(21) Appl. No.: 11/131,485

(22) Filed: May 18, 2005

(65) Prior Publication Data

US 2006/0264245 A1 Nov. 23, 2006

(51) Int. Cl.
*H04B 1/38* (2006.01)
*H04M 1/00* (2006.01)
*H04M 3/42* (2006.01)

(52) U.S. Cl. .................. 455/567; 455/568; 455/566

(58) Field of Classification Search ................. 455/567, 455/412.1, 412.2, 414.1, 415, 414.3, 414.4
See application file for complete search history.

(56) References Cited

U.S. PATENT DOCUMENTS

| | | | |
|---|---|---|---|
| 5,438,385 A | | 8/1995 | Tanaka |
| 6,272,359 B1 * | | 8/2001 | Kivela et al. ................. 455/567 |
| 6,377,823 B1 * | | 4/2002 | Higuchi et al. ............... 455/567 |
| 6,408,187 B1 * | | 6/2002 | Merriam ....................... 455/458 |
| 6,424,251 B1 * | | 7/2002 | Byrne .......................... 340/7.58 |
| 6,694,143 B1 | | 2/2004 | Beamish et al. |
| 6,745,054 B2 * | | 6/2004 | Fraccaroli ..................... 455/567 |
| 6,909,910 B2 * | | 6/2005 | Pappalardo et al. .......... 455/558 |
| 6,928,306 B2 * | | 8/2005 | Matsuda et al. .............. 455/567 |
| 6,968,216 B1 * | | 11/2005 | Chen et al. .................... 455/567 |
| 7,231,219 B2 * | | 6/2007 | Curtis et al. ............... 455/456.4 |
| 7,469,155 B2 * | | 12/2008 | Chu ............................. 455/567 |
| 7,542,786 B2 * | | 6/2009 | Westwood et al. ........... 455/567 |

FOREIGN PATENT DOCUMENTS

| | | |
|---|---|---|
| CN | 1492700 A | 4/2004 |
| EP | 1274269 A | 1/2003 |
| WO | WO9955102 A | 10/1999 |

OTHER PUBLICATIONS

Weiss K. et.al. "Conventional Local Area Radio Coverage System" Motorola Technical Developments, vol. 13, Jul. 1, 1991 pp. 67-69, XP000259225.

* cited by examiner

*Primary Examiner* — Tilahun B Gesesse
(74) *Attorney, Agent, or Firm* — Sterne, Kessler, Goldstein & Fox PLLC

(57) ABSTRACT

A system and method for controlling user notification characteristics of a mobile communication device. Various aspects of the present invention may comprise transmitting a wireless signal from a wireless transmitter. Such a wireless signal may, for example, comprise a characteristic designed to control user notification characteristics of mobile communication devices receiving the wireless signal. Such a wireless signal may, for example, be transmitted to an area in which control of user notification characteristics is desired. Various aspects of the present invention may also comprise receiving a wireless signal at a mobile communication device. The mobile communication device may, based at least in part on a characteristic of the received signal, select one or more user notification characteristics. The mobile communication device may then receive a communication from a communication system and generate a user notification to notify a user of the communication, wherein the user notification comprises the selected characteristic(s).

26 Claims, 6 Drawing Sheets

SYSTEM AND METHOD FOR CONTROLLING NOTIFICATION CHARACTERISTICS OF A MOBILE COMMUNICATION DEVICE

BACKGROUND OF THE INVENTION

Mobile communication devices are continually increasing in popularity. Such mobile communication devices include, for example and without limitation, cellular phones, paging devices and personal digital assistants. Mobile communication devices generally output some type of notification signal to indicate to a user that a message is arriving or has arrived. Such notification signals may have any of a variety of characteristics, including silent notification characteristics (e.g., a vibration or visible indication) and audible notification characteristics (e.g., any of a variety of ring tones at any of a variety of volumes). In particular settings in society, various notifications (e.g., audible notifications) are not desirable. For example, various audible notification signals emanating from mobile communication devices are unwelcome at various locations and at various times (e.g., in movie theaters, meeting rooms, churches during services, hospitals, infant bedrooms, etc.). Additionally, users of such mobile communication devices may at times forget to specify appropriate notification characteristics when carrying the mobile communication device in a setting in which particular notification characteristics are unacceptable.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for controlling user notification characteristics of a mobile communication device, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
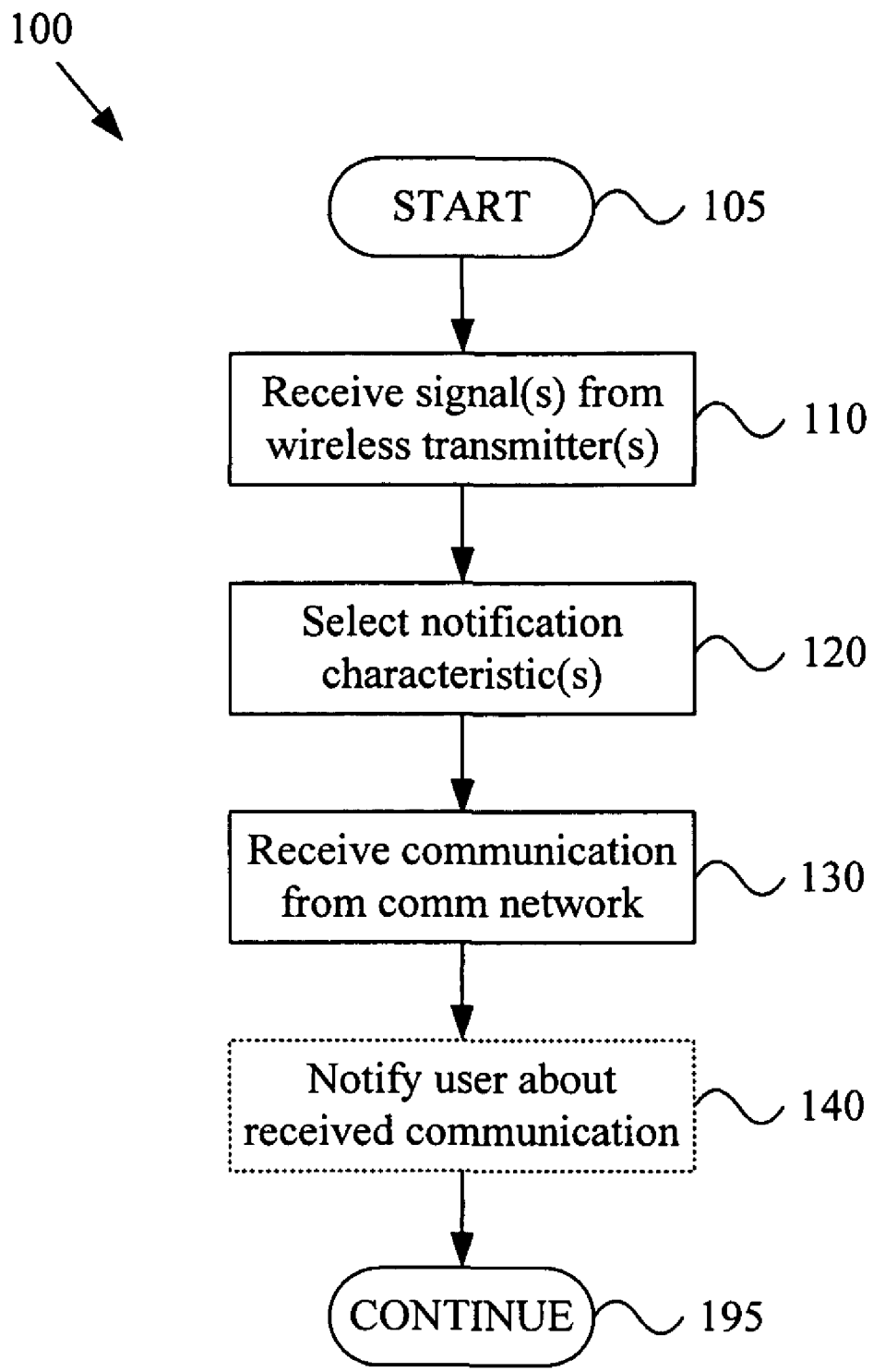
FIG. 1 is a diagram illustrating a method, in a mobile communication device, for controlling user notification characteristics of the mobile communication device, in accordance with various aspects of the present invention.

FIG. 1 is a diagram illustrating a method 100, in a mobile communication device, for controlling user notification characteristics of the mobile communication device, in accordance with various aspects of the present invention. A mobile communication device may comprise characteristics of any of a variety of mobile communication devices. For example and without limitation, a mobile communication device may comprise characteristics of a cellular telephone, paging device, portable email device, personal digital assistant (PDA) or pocket computer with mobile communication capability, etc. Accordingly, the scope of various aspects of the present invention should not be limited by characteristics of any particular type of mobile communication device.

The exemplary method 100 may begin at step 105. The method 100 may begin executing for any of a variety of reasons. For example and without limitation, the method 100 may begin executing in response to a mobile communication device being powered up or reset. Further for example, the method 100 may begin executing in response to a user command to begin. Also for example, the method 100 may begin executing in response to a signal received at the mobile communication device from another communication device. Accordingly, the scope of various aspects of the present invention should not be limited by characteristics of any particular initiating cause or condition.

The exemplary method 100 may, at step 110, comprise receiving a wireless signal (e.g., from a wireless transmitter). The wireless signal may comprise characteristics of any of a variety of wireless signals. For example and without limitation, the wireless signal may comprise characteristics of an RF signal or an optical signal. Also for example, the wireless signal may comprise characteristics of an electrostatic, electromagnetic or ultrasonic signal. Though the following examples may generally be presented in the context of receiving a wireless RF signal, the scope of various aspects of the present invention should not be limited by characteristics of an RF signal, RF signal receiver or other aspects of RF communications.

In a non-limiting exemplary scenario, the wireless signal may comprise characteristics of a wireless local area network (WLAN) or WiFi signal (or, for example, wireless PAN, MAN, WAN, etc.). Such a signal may, for example, comprise characteristics corresponding to any of a variety of wireless network communication standards (e.g., IEEE 802.11, IEEE 802.15, Bluetooth, UltraWideBand, Zigbee, etc.). Such a signal may also, for example comprise characteristics of various wireless communication standards (e.g., GSM, GPRS, EDGE, HSCSD, CDMA, WCDMA, TDMA, PDC, SMS, etc.). Such a signal may further, for example, comprise characteristics of various computer communication protocols (e.g., IP, Ethernet or IEEE 802.3, X.25, token ring or IEEE 802.5, etc.). The scope of various aspects of the present invention should not be limited by characteristics of any particular type of communication standard or protocol.

Note that in various non-limiting exemplary scenarios, the wireless signal might not necessarily adhere to all requirements of a particular standard or protocol. For example, the wireless signal might comprise enough characteristics of a WiFi signal for a mobile communication device equipped to receive WiFi signals to adequately receive the wireless signal. For example and without limitation, one or more wireless transmitters may transmit signals that mimic signals that a standard wireless LAN access point might transmit. The wireless transmitter(s) might, for example, be independent devices that are not components of a LAN or other communication network. In various exemplary scenarios, such signals might be dedicated to the control of mobile communication device user notification characteristics. In various other exemplary scenarios, such signals may be shared between a plurality of control and/or communication functions.

In various other non-limiting exemplary scenarios, the wireless signal might completely conform to a particular standard or protocol. For example, the wireless signal might comprise characteristics of a typical wireless LAN or WiFi signal (e.g., a beacon signal). A wireless transmitter might, for example, be a component of a wireless LAN access point. In other words, depending on the particular scenario, a wireless transmitter (or transmission system) may be an independent stand-alone entity or might be a component of a communication network. The scope of various aspects of the present invention should not be limited by whether a transmitter (or transmission system) that transmits the wireless signal is a component of a communication network or an independent entity.

Step 110 may, for example, comprise receiving one or more signals from one or more wireless transmitters. In a first non-limiting exemplary scenario, a wireless transmitter may transmit a continuous wireless signal that a mobile communication device may receive whenever it is within range. In a second non-limiting exemplary scenario, a wireless transmitter may periodically transmit a wireless signal that a mobile communication device may expect to receive within a maximum time period when it is within range. In a third non-limiting exemplary scenario, a plurality of wireless transmitters may be utilized to transmit wireless signals (continuous or periodic) to cover an area that might not be conveniently (or practically) covered by a single transmitter. In a fourth non-limiting exemplary scenario, a single transmitter may drive a plurality of antennas that are formed and positioned to provide aggregate coverage of a particular area. Accordingly, the scope of various aspects of the present invention should not be limited by temporal, spatial, numerical or other characteristics of a particular transmission system that might communicate a wireless signal.

Step 110 may also, for example and without limitation, prior to executing step 120, comprise receiving a particular number of wireless signals. For example, step 110 may comprise receiving N signals having particular characteristics prior to the exemplary method 100 executing step 120. Also for example, step 110 may comprise receiving a plurality of wireless signals over a time period prior to executing step 120. For example, step 110 may comprise receiving wireless signals having particular characteristics for a period of M minutes prior to the exemplary method 100 executing step 120. In various non-limiting exemplary scenarios, receiving a plurality of signals or receiving one or more signals over a time period may reduce the risk of automatically effecting a change in user notification characteristics when such a change is not desired (e.g., when a mobile communication device is merely carried by a movie theater or a church having black out zones). The scope of various aspects of the present invention should not be limited by characteristics of any particular number of received wireless signals or any particular time duration over which such signals might be received.

Step 110 may, for example, comprise receiving the wireless signal(s) in any of a variety of manners. For example and without limitation, step 110 may comprise continuously listening for the wireless signal(s). Also for example, step 110 may comprise periodically listening for the wireless signals(s) (e.g., to conserve energy). Step 110 may also, in various non-limiting exemplary scenarios, comprise transmitting a beacon or other signal to initiate the transmission of the wireless signal. The scope of various aspects of the present invention should not be limited by characteristics of any particular manner of receiving one or more wireless signals.

The exemplary method may, at step 120, comprise selecting at least one user notification characteristic, based at least in part on a characteristic of a received wireless signal (e.g., as received at step 110). As discussed previously, a mobile communication device may notify a user of an arriving or arrived message (e.g., a phone call, voice message, email, text message, video communication, etc.) utilizing any of a variety of user notification types. Various user notification types may comprise, without limitation, a vibration notification, an audible (or ring) notification, a visual indication, etc.

Step 120 may comprise selecting any of a variety of user notification characteristics. For example and without limitation, step 120 may comprise selecting a vibration characteristic (e.g., selecting to generate less noise via a mostly silent vibratory notification). In such an example, step 120 may also comprise selecting a vibration style, pattern, strength, etc. Also for example step 120 may comprise selecting an audible (or ring) characteristic (e.g., selecting to generate a less disturbing type or amount of audible noise). In such an example, step 120 may comprise selecting a ring style, ring volume, etc. Further for example, step 120 may comprise selecting a visible characteristic (e.g., selecting to generate an inaudible notification or a less noticeable visible notification). In such an example, step 120 may comprise selecting a flashing display or light, displaying a text message, etc. Still further for example, step 120 may comprise selecting to generate no user notification. In such an example, step 120 may comprise directing an incoming message to a mailbox without presently notifying the user. The scope of various aspects of the present invention should not be limited by characteristics of any particular user notification or combination thereof.

The characteristic(s) of the received wireless signal, on which selection of a notification characteristic may at least in part be based, may comprise any of a large variety of wireless signal characteristics. For example and without limitation, such a wireless signal characteristic may comprise information communicated by the wireless signal. For example, such information may comprise transmitter, access point, location, or network identification information (e.g., SSID information). Also for example, such information may comprise a particular bit or bit pattern (e.g., representing a number, string or enumerated type). Such information may, for example, comprise a command or keyword (e.g., "NoRing" or "NoCellPhone"). Further for example, such information may comprise geographical position information (e.g., defining a geographical location, area, volume, etc.). Such geographical information may, for example, define a region or area of user notification control (e.g., a blackout or reduced-noise area). Still further for example, such information may comprise information indicating a list (e.g., a prioritized list) of user notification characteristics that are allowable (or preferable).

The characteristic(s) of the received wireless signal may also, for example, comprise non-information characteristics. For example, such characteristics may comprise, signal strength, frequency, spread spectrum code, frequency hopping pattern, polarization, temporal characteristics, etc. In general, step 120 may comprise selecting one or more user notification characteristics based, at least in part, on any of a large variety of received signal characteristics. Accordingly, the scope of various aspects of the present invention should not be limited by any particular type of signal characteristic.

Exemplary step 120 may, for example and without limitation, comprise selecting at least one user notification characteristic based, at least in part, on a notification profile. A notification profile may generally be considered to be a set of information (e.g., stored in the mobile communication device) that may be utilized to make selection decisions regarding user notification characteristics. A notification profile may, for example, be entered into the mobile communication device by a user (e.g., directly or utilizing a computer linked to the mobile communication device).

A notification profile may comprise any of a variety of information. For example and without limitation, a notification profile may comprise information indicating whether the mobile communication device is enabled to perform automated selection of user notification characteristics (e.g., in accordance with exemplary method 100). Also for example, a notification profile may comprise information indicating for which particular areas or types of areas automated selection of user notification characteristics is enabled. For example, an area may be identified by identification number (e.g., LAN ID, SSID, transmitter identification) or other description (e.g., geographical coordinates of a particular room, building, town, etc.). Also for example, a type of area may be identified by area type (e.g., theater, conference room, church, hospital, library, infant bedroom, etc.). Additionally for example, a notification profile may comprise information identifying a particular source of signal for which automated selection of user notification characteristics is enabled (e.g., network, company, government agency, transmitter, etc.).

Further for example, a notification profile may comprise information that indicates times for which selection of user notification characteristics is acceptable (e.g., during weekends or evenings for a theater, during Sunday mornings for a church, never during rush hour, etc.). Also, a notification profile may comprise information indicating whether automated selection of user notification characteristics is available for particular incoming communications (e.g., source of an incoming communication or type of arriving communication). For example, a notification profile may not enable automated selection of user notification characteristics for incoming communications from a particular person or for incoming communications that are flagged as emergency communications. Also for example, a notification profile may comprise information indicating that automated selection of user notification characteristics is enabled or disabled once, enabled or disabled for a particular one time period (e.g., for the next two hours or two days), or enabled or disabled on a periodic basis (e.g., every weekend or every evening).

Also for example, a notification profile may only enable particular user notification characteristics to be selected or modified. For example and without limitation, a notification profile may comprise information indicating that user notifications may be automatically changed to a vibrate mode but not turned off completely. Also for example, a notification profile may comprise information indicating that a ring tone notifying the user of a call arriving from a boss may be turned down, but must still ring at least at some minimum volume. Additionally for example, a notification profile may comprise information that prioritizes notification characteristics. For example and without limitation, a notification profile may comprise information indicating that a vibrating notification is always preferred to an inaudible visible notification, and that a low-volume ring tone is preferred to a vibrating notification when the option is available.

The previous discussion provided various non-limiting examples of information that may be included in a notification profile that may be utilized (e.g., by step 120) to select particular user notification characteristics. The scope of various aspects of the present invention should not be limited by characteristics of information that may be included in a notification profile or by characteristics of any particular manner of utilizing such information to select user notification characteristics.

Step 120 may, in various non-limiting exemplary scenarios, comprise notifying a user of a selection of one or more user notification characteristics. For example, in a non-limiting exemplary scenario, where a mobile communication device executing step 120 selects one or more user notification characteristics that are different from those previously specified, step 120 may comprise outputting an indication to a user notifying the user of the change. For example, where step 120 comprises automatically changing user notification characteristics from an audible ring tone to a vibration mode, step 120 may comprise ringing or vibrating (e.g., combined with a displayed text message) to notify a user of the change. In various exemplary scenarios, step 120 may also comprise providing a user interface that enables a user to undo a notification change automatically made by step 120. In another non-limiting exemplary scenario, step 120 may comprise generating a textual notification to remind or ask a user to power down the mobile communication device.

In general, step 120 may comprise selecting at least one user notification characteristic, based at least in part on a characteristic of a received wireless signal (e.g., as received at step 110). Accordingly, the scope of various aspects of the present invention should not be limited by characteristics of a particular user notification characteristic, signal characteristic, or any particular manner of selecting one or more user notification characteristics (including, for example, the utilization of notification profile information).

The exemplary method 100 may, at step 130, comprise receiving, at the mobile communication device, a communication from a communication network. Such a communication may comprise characteristics of any of a variety of communication types. For example and without limitation, such a communication may comprise characteristics of a cellular phone call, an email message, a page, an instant message, a text message, a video communication, etc. Also, such a communication network may comprise characteristics of any of a variety of communication network types. For example and without limitation, such a communication network may comprise characteristics of a cellular telephone network, a wireless LAN, the Internet, a satellite communication network, a personal area network, the public switched telephone network, a cable television communication network, etc.

As mentioned previously, the communication network may be independent of the transmitter(s) from which the mobile communication device received the wireless signal (e.g., at step 110). For example and without limitation, the communication network may be a cellular telephone communication network, and the wireless transmitter may be an independent non-networked transmitter. Alternatively, for example, the transmitter from which the mobile communication device received the wireless signal (e.g., at step 110) may be a component (e.g., a wireless access point) of the communication network. For example and without limitation, the communication network (from which the communication is received) may comprise the Internet and a wireless LAN, and the wireless transmitter (from which the wireless signal is received) may comprise one or more transmitters associated with the wireless LAN. In fact, in various non-limiting exemplary scenarios, the wireless signal(s) received at step 110 may be associated with the communication received at step 130.

In general, step 130 may comprise receiving, at the mobile communication device, a communication from a communication network. Accordingly, the scope of various aspects of the present invention should not be limited by characteristics of any particular type of communication or by characteristics of any particular type of communication network from which a communication may be received by the mobile communication device.

The exemplary method 100 may, at step 140, comprise generating a user notification to notify a user about the received communication, where the user notification is characterized, at least in part, by the previously selected user notification characteristic(s) (e.g., as selected at step 120). Note, as indicated by the dashed box in the flow diagram, in various non-limiting exemplary scenarios (e.g., where step 120 determines not to generate a user notification), the exemplary method 100 might not include step 140. Various exemplary aspects of user notifications were discussed previously. The scope of various aspects of the present invention should not be limited by particular user notification characteristics or by any particular manner of generating user notifications comprising particular user notification characteristics.

The exemplary method 100 may, at step 195, comprise performing continued processing. Such continued processing may comprise characteristics of any of a large variety of continued processing activities. For example and without limitation, step 195 may comprise routing an incoming message to a mailbox. Step 195 may comprise performing such routing, for example, in a scenario where a vibrating or silent user notification is generated. Also for example, step 195 may comprise interfacing with a user regarding an arriving or arrived message. For example, step 195 may provide a user the capability to answer or conduct a phone call, specify the routing of a message to a mailbox, ignore an incoming message, respond to an incoming message, etc.

Step 195 may further, for example, comprise providing a user the capability to conduct a phone call in a silent mode. In such a silent mode, for example and without limitation, the user may listen to an incoming call via earphone (to avoid creating an audible disturbance) and communicate outgoing responses by pressing certain keys to send pre-recorded voice messages to the caller. Such pre-recorded messages may include sentences like "I cannot speak now, but I am listening, please tell me quickly what you want to let me know, and I will reply to you by sending limited pre-recorded voice messages such as 'Please go on', 'Yes", "No", 'Maybe," 'I have to hang up now,' 'I understand,' 'I will call you back,' and 'Bye.'" For example, to remind the user of particular messages, step 195 may comprise displaying a list of such pre-recorded voice messages on a display during the silent conversation (e.g., messages cross-listed with keypad or touch screen indications). During such an exemplary silent conversation, step 195 may also, for example, comprise muting the mobile communication device to avoid communicating unwanted sound (or noise) to the caller.

Continuing the non-limiting silent conversation scenario, step 195 may comprise, during the silent conversation mode, providing the user with the option to return to normal conversation by pressing a key to un-mute the phone. The silent conversation mode may, for example, be automatically entered when the user services an incoming message (e.g., answering an incoming phone call) while the mobile communication device has selected a non-audible user notification characteristic. Such an exemplary silent conversation mode may, for example and without limitation, work particularly well with mobile communication devices (e.g., cellular phones) having separated earphones (wired or wireless). In a non-limiting cellular telephone scenario, the user may listen to an incoming call while holding the cellular telephone in front (e.g., for convenient keypad operation in selecting pre-recorded voice messages). In such a silent conversation mode, a selected pre-recorded message may also, for example, be presented to the user so that the user may know whether the desired message was selected.

Step 195 may, for example, loop execution of the exemplary method 100 back up to step 110 for continued wireless signal receiving and notification selection. For example, step 195 may comprise determining when a wireless signal having particular characteristics is no longer being received or has not been received for a particular time interval. In such an exemplary scenario, step 195 may comprise (e.g., by looping execution of the exemplary method 100 back up to step 120) returning various user notification characteristics to previous (or default) settings when a wireless signal having particular characteristics is no longer being received. For example, when a user carries the mobile communication device out of a movie theater, church, hospital or other zone having user notification control, the exemplary method 100 may comprise determining that a user has left the zone and returning user notification characteristics back to settings that were in place prior to the user carrying the mobile communication device into the controlled zone. In another non-limiting exemplary scenario, step 195 may comprise determining (e.g., utilizing any of a number of position determination technologies (e.g., GSM, UltraWideBand, etc.)) that the mobile communication device is no longer in a zone with user notification control (e.g., an area defined with information contained in a wireless signal received at step 110) and adjusting user notification characteristics accordingly. In yet another non-limiting exemplary scenario, if a user removes the mobile communication device from a zone in which notification characteristics were controlled (e.g., completely disabled), and if there was an incoming message (e.g., a phone call) for which the mobile communication device did not output an adequate notification, step 195 may comprise notifying the user about the message (e.g., using default or prior user notification characteristics).

Step 195 may also, for example, comprise interfacing with a user regarding information stored in a notification profile, as discussed previously. For example, step 195 may comprise providing a user interface at the mobile communication device with which a user may specify information in the notification profile. Also for example, step 195 may comprise interfacing with another system (e.g., a personal computer or network server) regarding notification profile information that a user, other person or automated system may have specified. In general, step 195 may comprise performing any of a large variety of continued processing activities. Accordingly, the scope of various aspects of the present invention should not be limited by characteristics of any particular type of continued processing activity.

The exemplary method 100 was presented to provide specific illustrations of various generally broader aspects of the present invention. Accordingly, the scope of various aspects of the present invention should not be limited by characteristics of the exemplary method 100.

Figure 2:
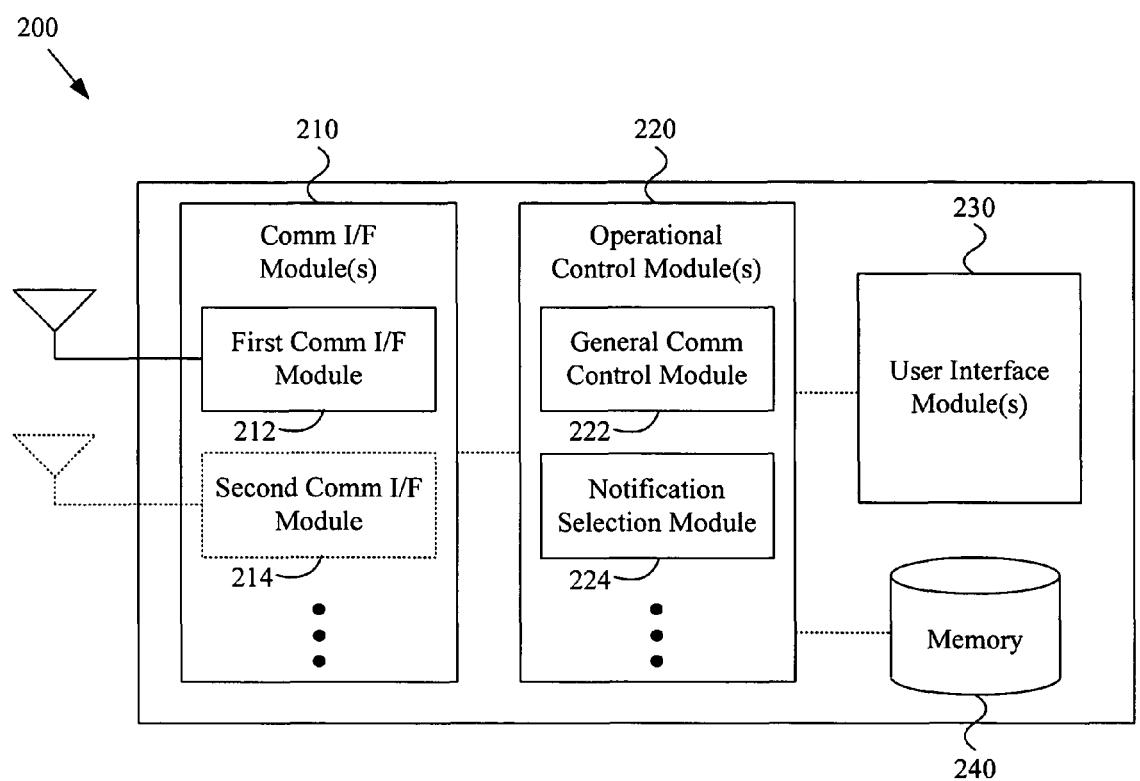
FIG. 2 is a diagram illustrating a mobile communication device that provides for the control of user notification characteristics, in accordance with various aspects of the present invention.

FIG. 2 is a diagram illustrating a mobile communication device 200 that provides for the control of user notification characteristics, in accordance with various aspects of the present invention. The mobile communication device 200 may, for example and without limitation, share various functional characteristics with the exemplary method 100 illustrated in FIG. 1 and discussed previously. The exemplary mobile communication device 200 may comprise one or more communication interface modules 210, one or more operational control modules 220, one or more user interface modules 230 and a memory 240. The communication interface module(s) 210 may, for example, comprise a first communication interface module 212 and a second communication interface module 214. The operational control module 220 may, for example, comprise a general communication control module 222 and a notification selection module 224. Various non-limiting aspects of the previously mentioned modules will now be discussed.

The exemplary mobile communication device 200 may comprise a first communication interface module 212. The first communication interface module 212 may comprise characteristics of any of a variety of communication interface modules. For example and without limitation, the first communication interface module may share various functional characteristics with step 110 of the exemplary method 100 illustrated in FIG. 1 and discussed previously.

The first communication interface module 212 may, for example, be adapted to receive a wireless signal (e.g., from a wireless transmitter). The wireless signal may comprise characteristics of any of a variety of wireless signals. For example and without limitation, the wireless signal may comprise characteristics of an RF signal or an optical signal. Also for example, the wireless signal may comprise characteristics of an electrostatic, electromagnetic or ultrasonic signal. The exemplary first communication interface module 212 is illustrated in FIG. 2, in a non-limiting manner, coupled to an RF antenna. Though the following examples may generally be presented in the context of the first communication interface module 212 receiving a wireless RF signal, the scope of various aspects of the present invention should not be limited by characteristics of an RF signal or module for receiving an RF signal.

In a non-limiting exemplary scenario, the first communication interface module 212 may be adapted to receive a wireless signal that comprises characteristics of a wireless local area network (WLAN) or WiFi signal (or, for example, wireless PAN, MAN, WAN, etc.). Such a signal may, for example, comprise characteristics corresponding to any of a variety of wireless network communication standards (e.g., IEEE 802.11, IEEE 802.15, Bluetooth, UltraWideBand, Zigbee, etc.). Such a signal may also, for example comprise characteristics of various wireless communication standards (e.g., GSM, GPRS, EDGE, HSCSD, CDMA, WCDMA, TDMA, PDC, SMS, etc.). Such a signal may further, for example, comprise characteristics of various computer communication protocols (e.g., IP, Ethernet or IEEE 802.3, X.25, token ring or IEEE 802.5, etc.). The scope of various aspects of the present invention should not be limited by characteristics of any particular type of communication standard or protocol or by characteristics of any particular communication interface module that may receive a signal communicated in accordance with a particular communication standard or protocol.

Note that in various non-limiting exemplary scenarios, the first communication interface module 212 may be adapted to receive a wireless signal that does not necessarily adhere to all requirements of a particular standard or protocol. For example, the first communication interface module 212 may receive a wireless signal that comprises enough characteristics of a WiFi signal for a communication module equipped to receive WiFi signals to adequately receive the wireless signal. For example and without limitation, one or more wireless transmitters may transmit signals that mimic signals that a standard wireless LAN access point might transmit. The wireless transmitter(s) might, for example, be independent devices that are not components of a LAN or other communication network. In various exemplary scenarios, such signals might be dedicated to the control of mobile communication device notification characteristics. In various other exemplary scenarios, such signals may be shared between a plurality of control functions.

In various other non-limiting exemplary scenarios, the first communication module 212 may be adapted to receive a wireless signal that completely conforms to a particular standard or protocol. For example, the wireless signal might comprise characteristics of a typical wireless LAN or WiFi signal (e.g., a beacon signal). A wireless transmitter might, for example, be a component of a wireless LAN access point. In other words, depending on the particular scenario, the first communication module 212 may be adapted to receive a wireless signal from a wireless transmitter (or transmission system) that is an independent stand-alone entity and/or from a wireless transmitter that is a component of a communication network. The scope of various aspects of the present invention should not be limited by whether the first communication module 212 is adapted to receive a wireless signal from a transmitter that is a component of a communication network or from a transmitter (or transmission system) that is an independent entity.

The first communication interface module 212 may be adapted to receive one or more signals from one or more wireless transmitters. In a first non-limiting exemplary scenario, the first communication interface module 212 may be adapted to receive a continuously transmitted wireless signal that the first communication interface module 212 may receive whenever the mobile communication device 200 is within range. In a second non-limiting exemplary scenario, the first communication interface module 212 may be adapted to receive a periodically transmitted wireless signal (e.g., a wireless signal that is expected to be transmitted within some maximum time period). In a third non-limiting exemplary scenario, the first communication interface module 212 may be adapted to receive wireless signals from a plurality of wireless transmitters, where such signals are transmitted to cover an area that might not be conveniently (or practically) covered by a single transmitter. In a fourth non-limiting exemplary scenario, the first communication interface module 212 may be adapted to receive wireless signals from a single transmitter driving a plurality of antennas that are formed and positioned to provide aggregate coverage of a particular area. Accordingly, the scope of various aspects of the present invention should not be limited by temporal, spatial, numerical or other characteristics of a particular transmission system from which a communication interface module might be adapted to receive wireless signals.

In various non-limiting exemplary scenarios, the first communication interface module 212 may be adapted to receive and/or process a particular number of wireless signals. For example, the first communication interface module 212 may be adapted to receive N signals having particular characteristics prior to the notification selection module 224 (to be discussed below) performing various selection operations. Also for example, the first communication interface module 212 may be adapted to receive a plurality of wireless signals over a particular time period prior to the notification selection module 224 performing various selection operations. For example, the first communication interface module 212 may be adapted to receive wireless signals having particular characteristics for a period of M minutes prior to the notification selection module 224 performing various selection operations. In various non-limiting exemplary scenarios, receiving a plurality of signals or receiving one or more signals over a time period may reduce the risk of automatically effecting a change in user notification characteristics when such a change is not desired (e.g., when a mobile communication device is merely carried by a movie theater or a church having black out zones). The scope of various aspects of the present invention should not be limited by characteristics of any particular number of received wireless signals or any particular time duration over which a communication interface module may receive such signals.

The first communication interface module 212 may receive one or more wireless signals in any of a variety of manners. For example and without limitation, the first communication interface module 212 may continuously listen for the wireless signal(s). Also for example, the first communication interface module 212 may periodically listen for the wireless signals(s) (e.g., to conserve energy). The first communication interface module 212 may also, in various non-limiting exemplary scenarios transmit a beacon or other signal to initiate the transmission of the wireless signal by another entity. The scope of various aspects of the present invention should not be limited by characteristics of any particular manner in which a communication interface module may receive one or more wireless signals.

As mentioned previously, the exemplary mobile communication device 200 may comprise a notification selection module 224. The notification selection module 224 may, for example, be adapted to select at least one user notification characteristic, based at least in part on one or more characteristics of one or more wireless signals received by the mobile communication device 200 (e.g., as received by the first communication interface module 212). The notification selection module 224 may, for example and without limitation, share various functional characteristics with step 120 of the exemplary method 100 illustrated in FIG. 1 and discussed previously.

The mobile communication device 200 may (e.g., utilizing the user interface module(s) 230) notify a user of an arriving or arrived message (e.g., a phone call, voice message, email, text message, video communication, etc.) utilizing any of a variety of user notification types. Various user notification types may comprise, without limitation, a vibration notification, an audible (or ring) notification, a visual indication, etc.

The notification selection module 224 may select any of a variety of user notification characteristics. For example and without limitation, the notification selection module 224 may select a vibration characteristic (e.g., selecting to generate less noise via a mostly silent vibratory notification). In such an example, the notification selection module 224 may also select a vibration style, pattern, strength, etc. Also for example the notification selection module 224 may select an audible (or ring) characteristic (e.g., selecting to generate a less disturbing type or amount of audible noise). In such an example, the notification selection module 224 may select a ring style, ring volume, etc. Further for example, the notification selection module 224 may select a visible characteristic (e.g., selecting to generate an inaudible notification or a less noticeable visible notification). In such an example, the notification selection module 224 may select a flashing display or light, displaying a text message, etc. Still further for example, the notification selection module 224 may select to generate no user notification. In such an example, the general communication control module 222 may direct an incoming message to a mailbox (e.g., in the memory 240) without presently utilizing the user interface module(s) 230 to notify the user. The scope of various aspects of the present invention should not be limited by characteristics of any particular user notification, lack thereof or combination thereof.

The characteristic(s) of the received wireless signal, on which the notification selection module 224 may base notification selection decisions, may comprise any of a large variety of wireless signal characteristics. For example and without limitation, such a wireless signal characteristic may comprise information communicated by the wireless signal. For example, such information may comprise transmitter, access point, location, or network identification information (e.g., SSID information). Also for example, such information may comprise a particular bit or bit pattern (e.g., representing a number, string or enumerated type). Such information may, for example, comprise a command or keyword (e.g., "NoRing" or "NoCellPhone"). Further for example, such information may comprise geographical position information (e.g., defining a geographical location, area, volume, etc.). Such geographical information may, for example, define a region or area of user notification control (e.g., a blackout or reduced-noise area). Still further for example, such information may comprise information indicating a list (e.g., a prioritized list) of user notification characteristics that are allowable (or preferable).

The characteristic(s) of the received wireless signal may also, for example, comprise non-information characteristics. For example, such characteristics may comprise, signal strength, frequency, spread spectrum code, frequency hopping pattern, polarization, temporal characteristics, etc. In general, the notification selection module 224 may select one or more user notification characteristics based, at least in part, on any of a large variety of received signal characteristics. Accordingly, the scope of various aspects of the present invention should not be limited by any particular type of signal characteristic.

The notification selection module 224 may also, for example and without limitation, select at least one user notification characteristic based, at least in part, on a notification profile. A notification profile may generally be considered to be a set of information (e.g., stored in the memory 240 of the mobile communication device 200) that may be utilized to make selection decisions regarding user notification characteristics. A notification profile may, for example, be entered into the mobile communication device 200 by a user (e.g., directly, utilizing the user interface module(s) 230, or indirectly, utilizing a computer linked to the mobile communication device 200). Various non-limiting exemplary aspects of notification profiles were discussed previously with regard to the exemplary method 100 illustrated in FIG. 1. The scope of various aspects of the present invention should not be limited by characteristics of information that may be included in a notification profile or by characteristics of any particular manner of, or mechanism for, utilizing such information to select user notification characteristics.

The notification selection module 224 may, in various non-limiting exemplary scenarios, notify a user of a selection of one or more user notification characteristics. For example, the notification selection module 224, may utilize the user interface module(s) 230 to generate such a notification. For example, in a non-limiting exemplary scenario, where the notification selection module 224 selects one or more user notification characteristics that are different from those previously specified, the notification selection module 224 may cause the user interface module(s) 230 to output an indication to a user notifying the user of the change. For example, where the notification selection module 224 automatically changes user notification characteristics from an audible ring tone to a vibration mode, the notification selection module 224 might utilize the user interface module(s) 230 to generate a ring or vibration (e.g., combined with a displayed text message) to notify a user of the change. In various exemplary scenarios, the notification selection module 224 (or other module) may utilize the user interface module(s) 230 to provide a user interface that enables a user to undo a notification change automatically made by the notification selection module 224. Further, in various exemplary scenarios, the mobile communication device 200 may utilize the user interface module(s) 230 to generate a signal (e.g., a textual signal) reminding or asking the user to turn off the mobile communication device 200.

In general, the notification selection module 224 may select at least one user notification characteristic, based at least in part on a characteristic of a received wireless signal (e.g., as received by the first communication interface module 210). Accordingly, the scope of various aspects of the present invention should not be limited by characteristics of a particular user notification characteristic, signal characteristic, or any particular manner of, or mechanism for, selecting one or more user notification characteristics (including, for example, the utilization of notification profile information).

As mentioned previously, the portable communication device 200 may comprise a second communication interface module 214. Such a second communication interface module 214 may, for example, be adapted to receive a communication from a communication network. For example and without limitation, the second communication module 214 may share various functional characteristics with step 130 of the exemplary method 100 illustrated in FIG. 1 and discussed previously.

The second communication interface module 214 may, for example, be adapted to receive a communication from a communication network. Such a communication may comprise characteristics of any of a variety of communication types. For example and without limitation, such a communication may comprise characteristics of a cellular phone call, an email message, a page, an instant message, a text message, a video communication, etc. Also, such a communication network may comprise characteristics of any of a variety of communication network types. For example and without limitation, such a communication network may comprise characteristics of a cellular telephone network, a wireless LAN, the Internet, a satellite communication network, a personal area network, the public switched telephone network, a cable television communication network, etc.

As mentioned previously, the communication network may be independent of the transmitter from which the wireless signal, discussed previously, may be received by the first communication interface module 212. For example and without limitation, the second communication interface module 214 may receive a communication from a cellular telephone communication network, and the first communication interface module 212 may receive a wireless signal from an independent non-networked wireless transmitter.

Alternatively, for example, the communication network may be communicatively coupled to (or incorporate) the wireless transmitter(s) from which the first communication interface module 212 receives the wireless signal(s). For example, the wireless transmitter(s) from which the first communication interface module 212 receives the wireless signal may correspond to access points of the communication network from which the second communication interface module 214 receives the communication. For example and without limitation, the communication network may comprise the Internet and a wireless LAN, and the wireless transmitter(s) may comprise one or more transmitters associated with the wireless LAN. In such a non-limiting exemplary scenario, the first communication interface module 212 and the second communication interface module 214 may share various components or all components. Such flexibility is indicated by the dashed line outlining the second communication interface module 214 in FIG. 2. In other words, depending on the communication scenario, the second communication interface module 214 may be the same module (or substantially the same module) as the first communication interface module 212.

In general, the second communication interface module 214 may receive a communication from a communication network. Accordingly, the scope of various aspects of the present invention should not be limited by characteristics of any particular type of communication or by characteristics of any particular type of communication network from which a communication may be received.

As mentioned previously, the exemplary mobile communication device 200 may also comprise one or more user interface module(s) 230. The user interface module(s) 230 may comprise characteristics of any of a variety of communication interface modules. For example and without limitation, the user interface module(s) 230 may share various functional characteristics with step 140 of the exemplary method 100 illustrated in FIG. 1 and discussed previously.

The mobile communication device 200, or a component thereof (e.g., the general communication control module 222), may utilize the user interface module(s) 230 to generate a user notification. For example and without limitation, the general communication control module 220 may, when a new communication has arrived (or is arriving), direct the user interface module(s) 230 to generate a user notification, where the user notification is characterized, at least in part, by selected user notification characteristic(s) (e.g., as selected by the notification selection module 224). Note, as explained previously, in various non-limiting exemplary scenarios (e.g., where the notification selection module 224 has determined not to generate a user notification), the mobile communication device 200 might not generate a user notification. Various exemplary aspects of user notifications were discussed previously. The scope of various aspects of the present invention should not be limited by particular user notification characteristics or by any particular manner of, or mechanism for, generating user notifications comprising particular user notification characteristics.

As mentioned previously, the mobile communication device 200 may comprise a general communication control module 222 that controls general communication functionality of the mobile communication device. For example and without limitation, depending on the particular system configuration or operating scenario, the general communication control module 222 may manage various aspects of cellular communication, paging, text messaging, video messaging, emailing, etc. The scope of various aspects of the present invention should not be limited by characteristics of any particular manner of, or mechanism for, controlling general communication operation of a mobile communication device.

The mobile communication device 200 may perform any of a large variety of additional operations. For example and without limitation, the mobile communication device 200 may share various functional characteristics with step 195 of the exemplary method 100 illustrated in FIG. 1 and discussed previously.

For example, the mobile communication device 200 (e.g., the general communication control module 222) may route an arriving message to a mailbox that is located in the memory 240. The general communication control module 222 may perform such routing, for example, in a scenario where a vibrating or silent user notification is generated. Also for example, the mobile communication device 200 (e.g., the general communication control module 222) may utilize the user interface module(s) 230 to interface with a user regarding an arriving or arrived message. For example, the mobile communication device 200 may provide a user the capability to answer and/or conduct a phone call, specify the routing of a message to a mailbox, ignore an incoming message, respond to an incoming message, etc.

Further for example, the mobile communication device 200 may (e.g., utilizing the first communication interface module 212) determine when a wireless signal having particular characteristics is no longer being received or has not been received for a particular time interval. In such an exemplary scenario, the mobile communication device 200 (e.g., the notification selection module 224) may return various user notification characteristics to previous (or default) settings when a wireless signal having particular characteristics is no longer being received. For example, when a user carries the mobile communication device 200 out of a movie theater, church, hospital or other zone having user notification control, the exemplary mobile communication device 200 (e.g., the notification selection module 224) may determine that a user has left the zone and return user notification characteristics back to settings that were in place prior to the user carrying the mobile communication device 200 into the controlled zone. In another non-limiting exemplary scenario, the mobile communication device 200 may determine (e.g., utilizing any of a number of position determination technologies (e.g., GSM, UltraWideBand, etc.)) that the mobile communication device 200 is no longer in a zone with user notification control (e.g., an area defined with information contained in a wireless signal received previously by the first communication interface module 212) and adjust user notification characteristics accordingly.

The mobile communication device 200 may also (e.g., utilizing the user interface module(s) 230) interface with a user regarding information stored in a notification profile, as discussed previously. For example, the user interface module(s) 230 may provide a user interface at the mobile communication device 200 with which a user may specify information in the notification profile. Also for example, the mobile communication device 200 may interface with another system (e.g., a personal computer or network server) regarding notification profile information that a user, other person or automated system may have specified. In general, the mobile communication device 200 may perform any of a large variety of additional operations. Accordingly, the scope of various aspects of the present invention should not be limited by characteristics of any particular type of continued additional operations.

The exemplary mobile communication device 200 was presented to provide specific illustrations of various generally broader aspects of the present invention. Accordingly, the scope of various aspects of the present invention should not be limited by characteristics of the exemplary mobile communication device 200.

Figure 3:
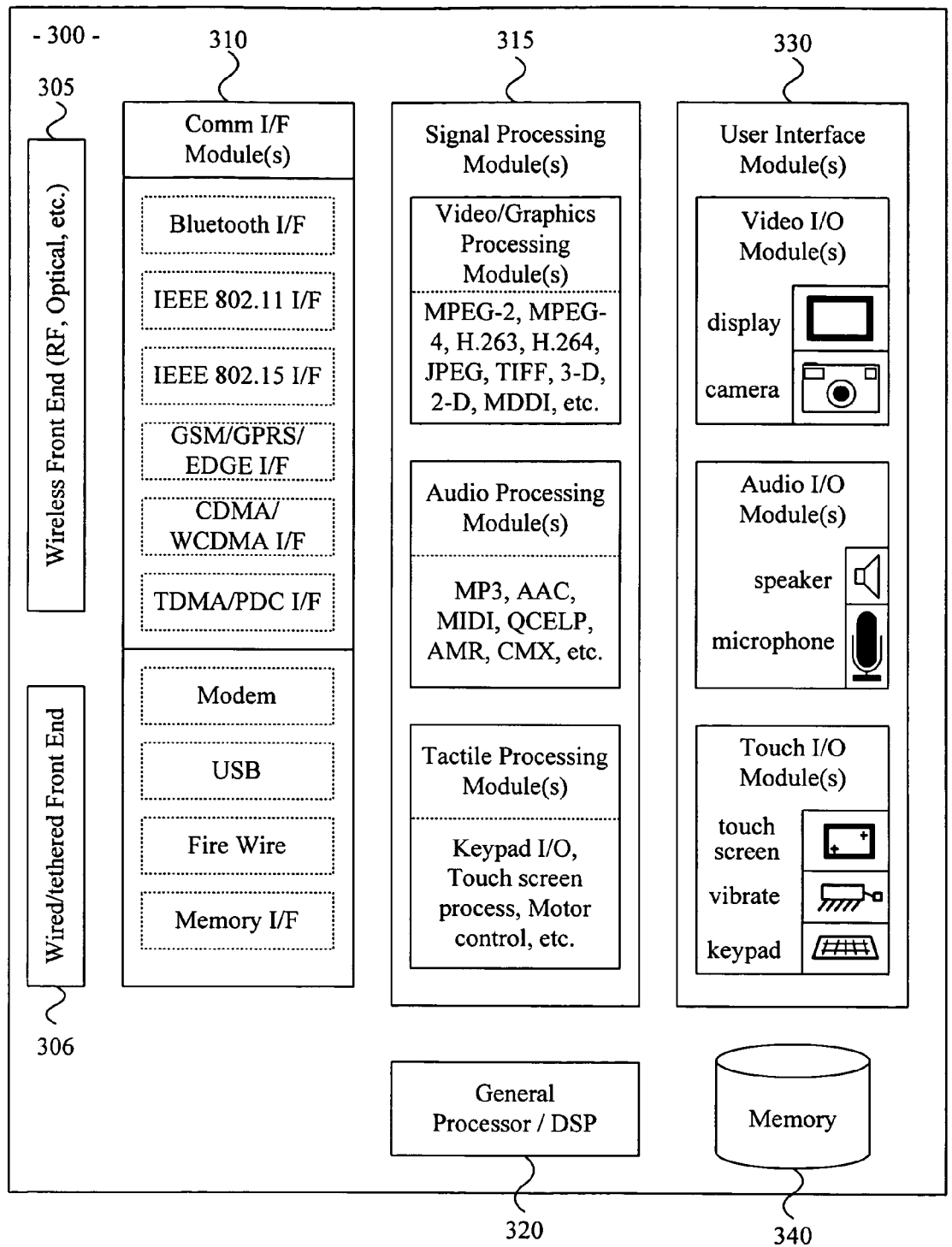
FIG. 3 is a diagram illustrating a mobile communication device that provides for the control of user notification characteristics, in accordance with various aspects of the present invention.

FIG. 3 is a diagram illustrating a mobile communication device 300 that provides for the control of user notification characteristics, in accordance with various aspects of the present invention. The exemplary mobile communication device 300 may, for example and without limitation, share various characteristics with the exemplary mobile communication device 200 illustrated in FIG. 2 and discussed previously. Further for example, the mobile communication device 300 may share various functional characteristics with the exemplary method 100 illustrated in FIG. 1 and discussed previously.

The exemplary mobile communication device 300 may comprise a wireless front end 305 and/or a wired/tethered front end 306. The wireless front end 305 and the wired/tethered front end 306 may be communicatively coupled to any of a variety of communication interface modules 310. The exemplary mobile communication device 300 is illustrated with a non-limiting exemplary set of communication interface modules 310, including: a Bluetooth interface module, IEEE 802.11 interface module, IEEE 802.15 interface module, GSM/GPRS/EDGE interface module, CDMA/WCDMA interface module, TDMA/PDC interface module, modem module, USB module, fire wire module and memory interface module (e.g., for interfacing with off-board or removable memory). The wireless front end 305, wired/tethered front end 306 and communication interface modules 310 may, for example and without limitation, share various characteristics with the communication interface module(s) 210 (e.g., including the first communication interface module 212 and the second communication interface module 214) of the exemplary mobile communication device 200 illustrated in FIG. 2 and discussed previously.

The exemplary mobile communication device 300 may also comprise any of a variety of user interface modules 330. The user interface modules 330 may, for example and without limitation, share various characteristics with the user interface module(s) 230 of the exemplary mobile communication device 200 illustrated in FIG. 2 and discussed previously. The exemplary mobile communication device 300 is illustrated with a non-limiting exemplary set of user interface modules 330 (or sub-modules). The user interface modules 330 may, for example, comprise any of a variety of video/graphics processing modules, audio processing modules, and tactile signal processing modules. The mobile communication device 300 may also comprise compatible user interface devices corresponding to the various user interface modules 330 (e.g., a video display, camera, speaker, microphone, touch screen, keypad, vibrator, etc.).

The exemplary mobile communication device 300 is illustrated with a non-limiting exemplary set of signal processing modules 315, which may be selectively utilized in accordance with current signal processing needs. The signal processing modules 315 may, for example, comprise various video, audio, textual and tactile signal-processing modules. The signal processing modules 315 may generally, for example, process information conveyed between the front ends 305, 306 and communication interface module(s) 310 of the mobile communication device 300 and the user interface module(s) 330 of the mobile communication device 300.

The exemplary mobile communication device 300 may also comprise a general processor 320 (and/or a digital signal processor) and on-board memory 340. The general processor 320, which may be a baseband processor for example, and memory 340 may perform any of a wide variety of operational tasks for the mobile communication device 300. For example and without limitation, the general processor 320 and memory 340 may share various characteristics with the operational control module(s) 220 and memory 240 of the exemplary mobile communication device 200 illustrated in FIG. 2 and discussed previously.

It should be noted that various modules of the previously discussed exemplary mobile communication devices 200, 300 may be implemented in hardware, software, or a combination thereof. Also, various modules may share portions of hardware and software. For example, a first and second module may share one or more hardware components and/or one or more software routines. Accordingly, the scope of various aspects of the present invention should not be limited by any particular hardware or software implementation of the various modules or by arbitrary hardware and software boundaries between the various modules.

Further, the various modules of the exemplary mobile communication devices 200, 300 may be implemented in various degrees of integration. For example and without limitation, the modules may all be integrated on a single chip. Also for example, the various modules may be implemented in separate chips of a single circuit board. Accordingly, the scope of various aspects of the present invention should not be limited by characteristics of any particular implementation or level of integration of the various exemplary modules.

Figure 4:
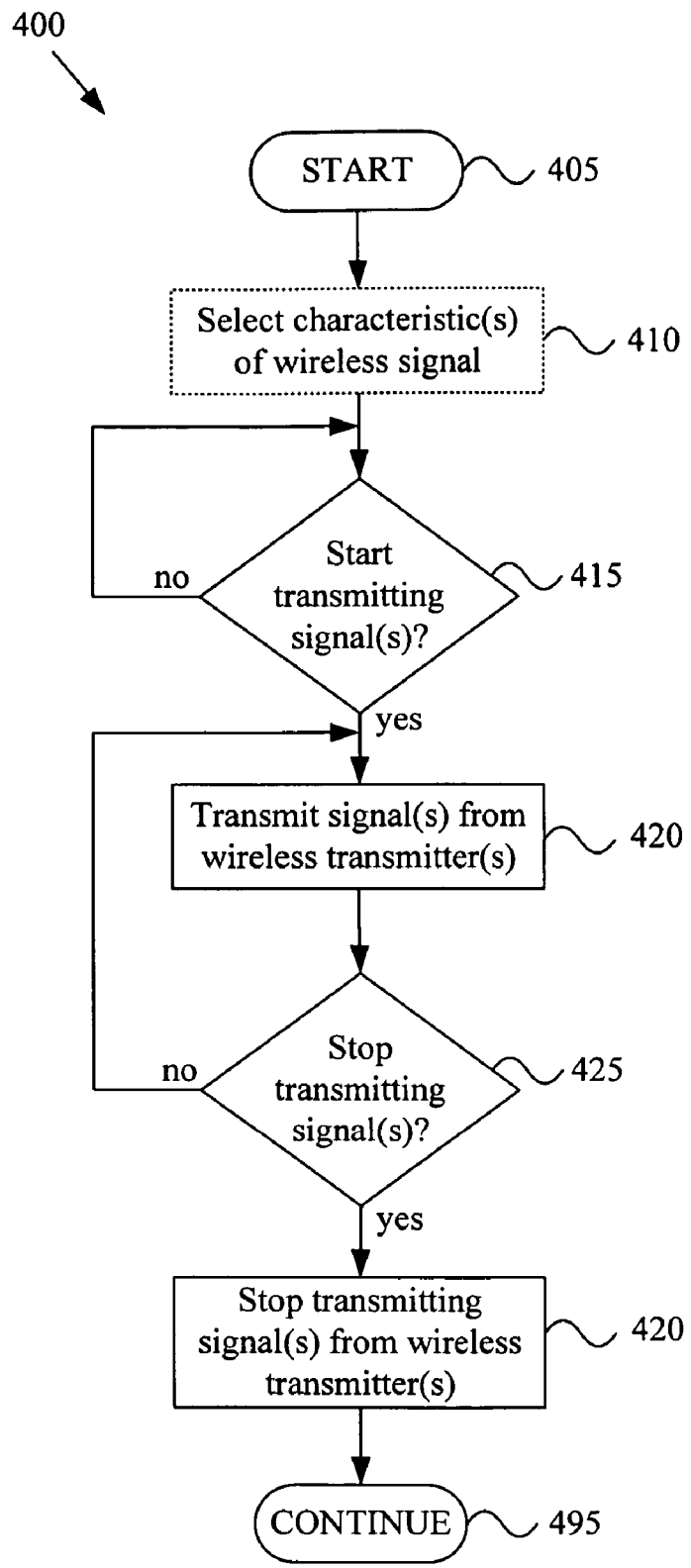
FIG. 4 is a diagram illustrating a method for controlling characteristics of a user notification generated by a mobile communication device, in accordance with various aspects of the present invention.

FIG. 4 is a diagram illustrating a method 400 for controlling characteristics of a user notification generated by a mobile communication device, in accordance with various aspects of the present invention. The exemplary method 400 may be implemented in any of a variety of wireless communication (e.g., transmission) equipment. For example and without limitation, the exemplary method 400 may be implemented in one or more independent wireless transmitters (e.g., not communicatively coupled to a communication network that communicates with the mobile communication device). Alternatively for example, the exemplary method 400 may be implemented in one or more transmitters (e.g., wireless network access points) that may be components of a communication network that communicates with the mobile communication device. The following example will generally be discussed from the perspective of a single transmitter (or transmission system). However, the scope of various aspects of the present invention should not be limited by characteristics of a single transmitter (or transmission system) implementation. Additionally, the scope of various aspects of the present invention should not be limited by characteristics of any particular type of wireless transmitter (or transmission system) that may implement various aspects of the exemplary method 400.

The exemplary method 400 may begin executing at step 405. The method 400 may begin executing for any of a variety of reasons. For example and without limitation, the method 400 may begin executing in response to a wireless transmitter (or set of transmitters) being powered up or reset. Further for example, the method 400 may begin executing in response to a user command to begin. Also for example, the method 400 may begin in response to a signal received by a device external to the wireless transmitter(s). Accordingly, the scope of various aspects of the present invention should not be limited by characteristics of any particular initiating cause or condition.

The exemplary method 400 may, at step 410, comprise selecting one or more characteristics of a wireless signal to be transmitted by the wireless transmitter implementing the method 400. Step 410 may, for example, comprise selecting signal characteristics that, when received and processed by a mobile communication device, will cause the mobile communication device to select particular user notification characteristics. As discussed previously with regard to the exemplary method 100 illustrated in FIG. 1, the wireless signal may be characterized by any of a large variety of characteristics, upon which a mobile communication device may base notification control decisions.

For example and without limitation, such a wireless signal characteristic may comprise information communicated by the signal. For example, such information may comprise transmitter, access point, location, or network identification information (e.g., SSID information). Also for example, such information may comprise a particular bit or bit pattern (e.g., representing a number, string or enumerated type). Such information may, for example, comprise a command or keyword (e.g., "NoRing" or "NoCellPhone"). Further for example, such information may comprise geographical position information (e.g., defining a geographical location, area, volume, etc.). Such geographical information may, for example, define a region or area of user notification control (e.g., a blackout or reduced-noise area). Still further for example, such information may comprise information indicating a list (e.g., a prioritized list) of user notification characteristics that are allowable (or preferable).

The characteristic(s) of the transmitted wireless signal may also, for example, comprise non-information characteristics. For example, such characteristics may comprise, signal strength, frequency, spread spectrum code, frequency hopping pattern, polarization, temporal characteristics, etc. Note that in various non-limiting exemplary scenarios, such characteristics may be predetermined (e.g., known or established prior to execution of the exemplary method 400). In such exemplary scenarios, as indicated by the dashed line highlighting step 410, the exemplary method 400 may not execute step 410.

In general, step 410 (or some prior step) may comprise selecting one or more characteristics of a wireless signal to be transmitted by the wireless transmitter. Accordingly, the scope of various aspects of the present invention should not be limited by any particular type of signal characteristic.

The exemplary method 400 may, at step 415, comprise determining when to start transmitting the wireless signal (e.g., for which one or more characteristics were selected at step 410). For example and without limitation, step 415 may comprise determining whether it is time to transmit the wireless signal (e.g., during a movie presentation, during a sermon, during quiet hours, during a meeting, during operating hours, etc.). Step 415 may also, for example, comprise waiting for a user command or a command from another system that indicates the wireless signal is to be transmitted. Note that in various non-limiting exemplary scenarios, step 415 may be skipped. For example, in a non-limiting exemplary scenario, a wireless transmitter (or transmission system) implementing the exemplary method 400 may always transmit the wireless signal(s). Accordingly, the scope of various aspects of the present invention should not be limited by any particular conditions that might indicate when to transmit the wireless signal.

The exemplary method 400 may, at step 420, comprise transmitting the wireless signal from a wireless transmitter. The wireless signal may, for example, be adapted to be received and/or processed by a mobile communication device. Similar to the wireless signal(s) discussed previously with regard to the exemplary method 100 illustrated in FIG. 1, the wireless signal may comprise any of a large variety of characteristics, and step 420 may comprise transmitting the wireless signal in any of a large variety of manners.

For example and without limitation, the wireless signal may comprise characteristics of an RF signal or an optical signal. Also for example, the wireless signal may comprise characteristics of an electrostatic, electromagnetic or ultrasonic signal. Though the following examples may generally be presented in the context of transmitting a wireless RF signal, the scope of various aspects of the present invention should not be limited by characteristics of an RF signal, RF transmitter, or any other particular aspect of RF communications.

In a non-limiting exemplary scenario, the wireless signal may comprise characteristics of a wireless local area network (WLAN) or WiFi signal (or, for example, wireless PAN, MAN, WAN, etc.). Such a wireless signal may, for example, comprise characteristics corresponding to any of a variety of wireless network communication standards (e.g., IEEE 802.11, IEEE 802.15, Bluetooth, UltraWideBand, Zigbee, etc.). Such a wireless signal may also, for example comprise characteristics of various wireless communication standards (e.g., GSM, GPRS, EDGE, HSCSD, CDMA, WCDMA, TDMA, PDC, SMS, etc.). Such a wireless signal may further, for example, comprise characteristics of various computer communication protocols (e.g., IP, Ethernet or IEEE 802.3, X.25, token ring or IEEE 802.5, etc.). The scope of various aspects of the present invention should not be limited by characteristics of any particular communication standard or protocol.

Note that in various non-limiting exemplary scenarios, the wireless signal might not necessarily conform to all requirements of a particular standard or protocol. For example, the wireless signal might comprise enough characteristics of a WiFi signal for a mobile communication device equipped to receive WiFi signals to adequately receive the wireless signal. For example and without limitation, a wireless transmitter (or transmission system) implementing various aspects of the exemplary method 400 may transmit signals that mimic signals that a standard wireless LAN access point might transmit (e.g., a beacon signal). The wireless transmitter (or transmission system) might, however, be an independent device (or system) that is not a component of a LAN or other communication network. In various exemplary scenarios, the wireless signal might be dedicated to the control of mobile communication device notification characteristics. In various other exemplary scenarios, the wireless signal may be shared by a plurality of various control functions.

In various other non-limiting exemplary scenarios, the wireless signal might completely conform to a particular standard or protocol. For example, the wireless signal might comprise characteristics of a typical wireless LAN or WiFi signal. A wireless transmitter might, for example, be a component of a wireless LAN access point. In other words, depending on the particular scenario, a wireless transmitter (or transmission system) implementing the exemplary method 400 may be an independent entity or might be a component of a communication network. The scope of various aspects of the present invention should not be limited by whether a transmitter (or transmission system) that transmits the wireless signal is a component of a communication network or an independent entity.

Step 420 may, for example, comprise transmitting the wireless signal continuously, periodically, or non-periodically. For example, step 420 may comprise transmitting the wireless signal periodically with a constant period that mobile communication devices can rely on. Further for example, step 420 may comprise transmitting the wireless signal in response to a request for such a signal or in response to a beacon signal or inquiry signal communicated from a mobile communication device.

Step 420 may, for example, comprise transmitting the wireless signal to a coverage area in which it is desired to control characteristics of user notifications generated by mobile communication devices. Such coverage areas may, for example, comprise auditoriums, rooms, buildings, cathedrals, campuses, etc. Again, it is emphasized that though the exemplary method 400 is discussed herein generally in the context of a single transmitter, various aspects of the present invention are readily extensible to multi-transmitter (or, for example, multi-antenna) systems. In a non-limiting exemplary scenario, step 420 may comprise transmitting a plurality of wireless RF signals from a plurality of respective antennas to cover a particular coverage area in which it is desired to control characteristics of user notifications generated by mobile communication devices. For example, step 420 may comprise utilizing a plurality of transmitters and/or antennas to transmit a plurality of signals to respective coverage areas. Step 420 may, for example, utilize directional antennas and/or transmission power control to control the respective coverage areas. The respective coverage areas may, in aggregate, provide coverage to an overall desired coverage area.

In general, step 420 may comprise transmitting the wireless signal from a wireless transmitter (or transmission system). Accordingly, the scope of various aspects of the present invention should not be limited by characteristics of any particular signal type, communication standard or protocol, communication medium, or any particular manner of transmitting a signal.

The exemplary method 400 may, at step 425, comprise determining whether to continue transmitting the wireless signal from the wireless transmitter (or transmission system). For example and without limitation, in a non-limiting exemplary scenario, where the method 400 comprises transmitting the wireless signal (e.g., continually, periodically or responsively) during a time interval (e.g., during a movie, sermon, speech, meeting, presentation, etc.), step 425 may comprise determining whether the time interval has completed. In another non-limiting exemplary scenario, step 425 may comprise determining whether a user (or some other source) has commanded the transmitter to stop transmitting the wireless signal. Accordingly, the scope of various aspects of the present invention should not be limited by characteristics of a particular cause or condition for stopping transmission of the wireless signal or by characteristics of any particular manner of determining such cause or condition.

If step 425 determines that the transmitter (or transmission system) implementing the exemplary method 400 should continue transmitting the wireless signal, then execution of the exemplary method 400 may flow to step 420 for continued transmission of the wireless signal. If, however, step 425 determines that the transmitter should stop transmitting the wireless signal, then execution of the exemplary method 400 may flow to step 420, which is discussed below.

The exemplary method 400 may, at step 420, comprise stopping transmission of the wireless signal from the wireless transmitter (or transmission system). Step 420 may comprise stopping transmission of the wireless signal in any of a variety of manners. For example and without limitation, step 420 may comprise powering down the transmitter (or transmission system) implementing the method 400. Also for example, step 420 may comprise stopping response to requests for the transmitter to transmit the wireless signal. Additionally for example, step 420 may comprise stopping a clock that triggers periodic transmission of the wireless signal. Accordingly, the scope of various aspects of the present invention should not be limited by characteristics of any particular manner of stopping transmission of the wireless signal.

The exemplary method 400 may, at step 495, comprise performing continued processing. Such continued processing may comprise performing any of a large variety of continued processing activities. For example and without limitation, step 495 may comprise returning execution flow of the exemplary method 400 back up to steps 410 or 415 for determining when to restart transmission of the wireless signal. Also for example, step 495 may comprise tracking transmission performance (e.g., maintaining operation log information). Further for example, step 495 may comprise interfacing with a user to modify various operational characteristics of the transmitter or transmission system implementing the exemplary method 400. Still further for example, step 495 may comprise powering down the transmitter or transmission system implementing the exemplary method 400. Also for example, step 495 may comprise performing transmission system testing or maintenance activities. Further for example, step 495 may comprise generally communicating with mobile communication devices. Accordingly, the scope of various aspects of the present invention should not be limited by characteristics of any particular continued processing activity that may be performed by a transmitter or transmission system implementing the exemplary method 400.

The exemplary method 400 was presented to provide specific illustrations of various generally broader aspects of the present invention. Accordingly, the scope of various aspects of the present invention should not be limited by characteristics of the exemplary method 400.

Figure 5:
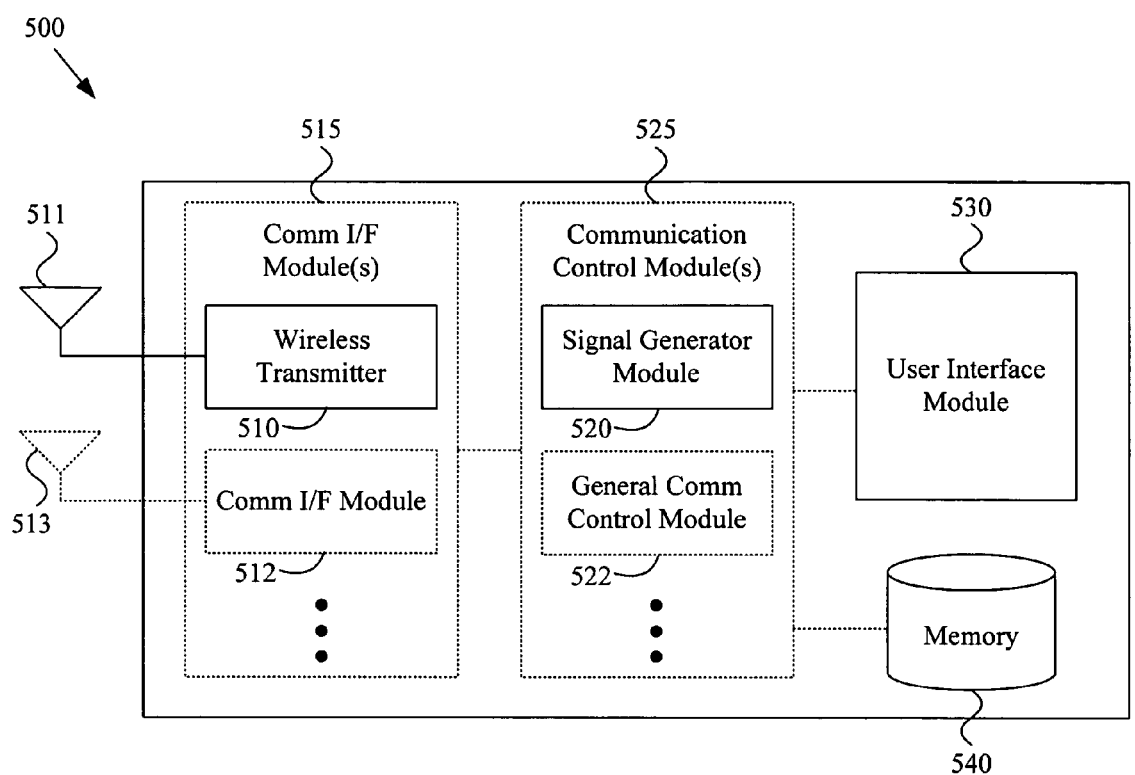
FIG. 5 is a diagram illustrating a system for controlling characteristics of a user notification generated by a mobile communication device, in accordance with various aspects of the present invention.

FIG. 5 is a diagram illustrating a system 500 for controlling characteristics of a user notification generated by a mobile communication device, in accordance with various aspects of the present invention. The exemplary system 500 may, for example and without limitation, share various functional characteristics with the exemplary method 400 illustrated in FIG. 4 and discussed previously.

The exemplary system 500 may comprise one or more communication interface modules 515, one or more communication control modules 525, one or more user interface modules 530, and a memory 540. The communication interface module(s) 515 may, for example, comprise a wireless transmitter 510 communicatively coupled to an antenna 511. The communication interface module(s) 515 may also, in various non-limiting exemplary scenarios, comprise a communication interface module 512 communicatively coupled to an antenna 513. The communication control module(s) 525 may, for example, comprise a signal generator module 520. The communication control module(s) 525 may also, in various non-limiting exemplary scenarios, comprise a general communication control module 522. Various non-limiting aspects of the previously mentioned modules will now be discussed.

The exemplary system 500 may be implemented in any of a variety of wireless transmission equipment. For example and without limitation, the exemplary system 500 may be implemented in an independent transmission system (e.g., not communicatively coupled to a communication network that communicates with mobile communication devices). Alternatively for example, the exemplary system 500 may be implemented in one or more components of a communication network (e.g., in one or more wireless access points) that communicate with mobile communication devices. The following examples will generally be discussed from the perspective of a single transmitter (or transmission system) implementation. However, the scope of various aspects of the present invention should not be limited by characteristics of a single transmitter implementation. Additionally, the scope of various aspects of the present invention should not be limited by characteristics of any particular type of wireless transmitter that may implement or incorporate various aspects of the exemplary system 500.

As mentioned previously, the exemplary system 500 may comprise a signal generator module 520. The signal generator module 520 may, for example, select one or more characteristics of a wireless signal to be transmitted by the system 500 (e.g., the wireless transmitter 510). The signal generator module 520 may, for example and without limitation, share various functional aspects with step 410 of the exemplary method 400 illustrated in FIG. 4 and discussed previously.

For example, the signal generator module 520 may select signal characteristics that, when received and processed by a mobile communication device, will cause the mobile communication device to select particular user notification characteristics. As discussed previously (e.g., with regard to the exemplary method 400 illustrated in FIG. 4), the wireless signal may be characterized by any of a large variety of characteristics, upon which a mobile communication device may base user notification control decisions. The scope of various aspects of the present invention should not be limited by any particular type of signal characteristic or any particular manner of selecting one or more signal characteristics.

The signal generator module 520 (or a related module) may also determine when to start and/or stop transmitting the wireless signal (e.g., for which one or more characteristics were selected). For example and without limitation, the signal generator module 520 may share various functional characteristics with steps 415 and 425 of the exemplary method 400 illustrated in FIG. 4 and discussed previously.

For example, the signal generator module 520 may determine when it is time to transmit the wireless signal (e.g., during a movie presentation, during a sermon, during quiet hours, during a meeting, during operating hours, etc.). The signal generator module 520 may also, for example, wait for a user command or a command from another system that indicates the wireless signal is to be transmitted. Note that in various non-limiting exemplary scenarios, determining when to transmit may be unnecessary. For example, in a non-limiting exemplary scenario, the exemplary system 500 may always transmit the wireless signal. Accordingly, the scope of various aspects of the present invention should not be limited by any particular conditions that might indicate when to transmit the wireless signal.

Once the wireless signal is being transmitted, the signal generator module 520 may also, for example, determine when to stop transmitting the wireless signal. For example, in a non-limiting exemplary scenario where the system transmits the wireless signal (e.g., continually, periodically or responsively) during a time interval (e.g., during a movie, sermon, speech, meeting, presentation, etc.), the signal generator module 520 may determine when the time interval has completed. In another non-limiting exemplary scenario, the signal generator module 520 may determine whether a user (or some other source) has commanded the system 500 to stop transmitting the wireless signal. Accordingly, the scope of various aspects of the present invention should not be limited by characteristics of a particular cause or condition for stopping transmission of the wireless signal or by characteristics of any particular manner of, or mechanism for, determining such a cause or condition.

As mentioned previously, the exemplary system 500 may also comprise a wireless transmitter 510 for transmitting the wireless signal (e.g., for which the signal generator module 520 determined one or more characteristics). The wireless transmitter 510 may, for example and without limitation, share various functional characteristics with step 420 of the exemplary method 400 illustrated in FIG. 4 and discussed previously.

For example, the wireless transmitter 510 may be adapted to transmit the wireless signal, where the wireless signal is designed to be received and/or processed by a mobile communication device. Similar to the wireless signal(s) discussed previously with regard to the exemplary methods 100, 400 illustrated in FIGS. 1 and 4, the wireless signal may comprise any of a large variety of characteristics, and the wireless transmitter 510 may transmit the wireless signal in any of a large variety of manners. Accordingly, the scope of various aspects of the present invention should not be limited by characteristics of any particular signal characteristics or manner of transmitting a signal.

Figure 6:
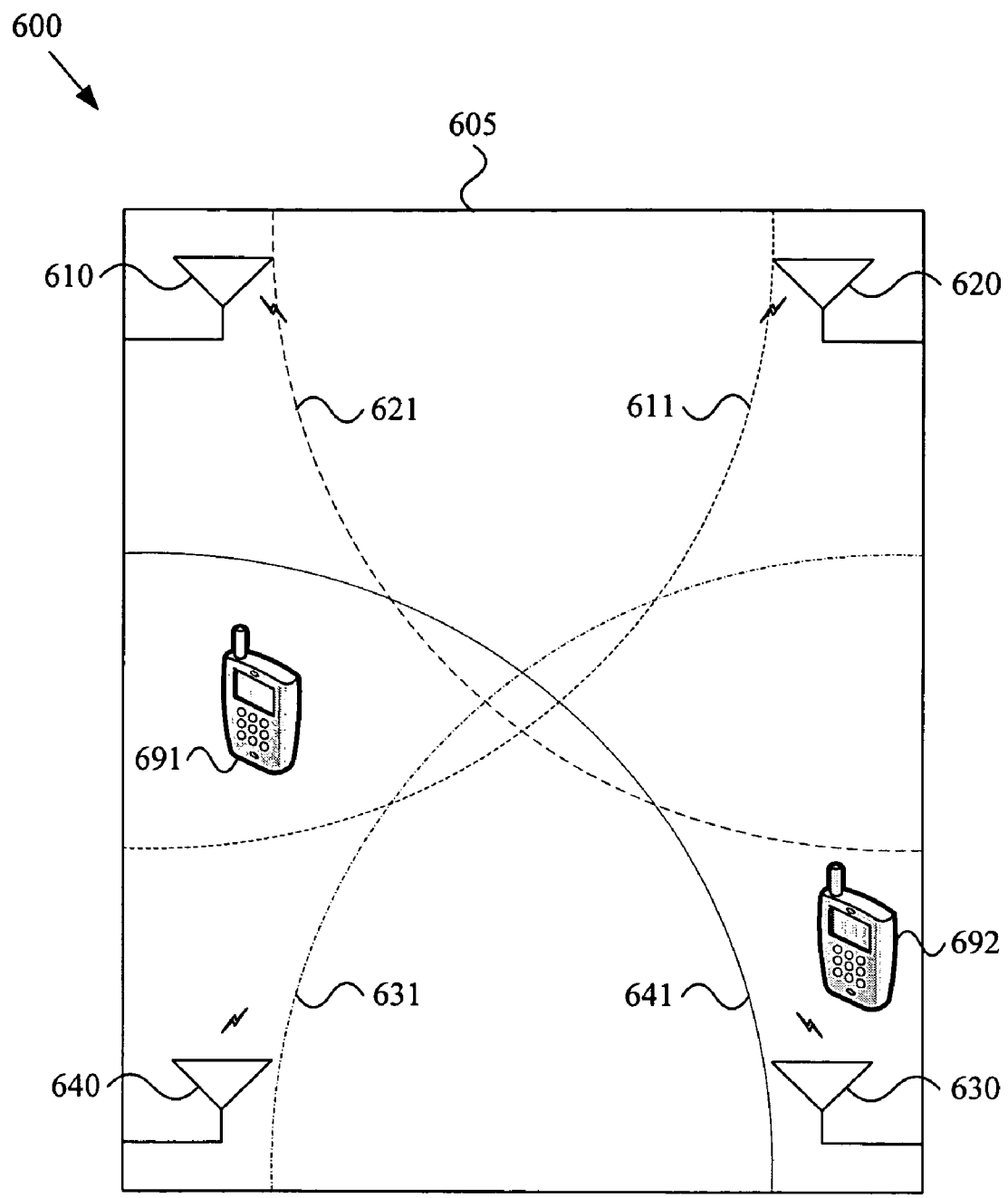
FIG. 6 is a diagram illustrating a system for controlling characteristics of a user notification generated by a mobile communication device, in accordance with various aspects of the present invention.

The wireless transmitter 510 may, for example, transmit the wireless signal to a coverage area in which it is desired to control characteristics of user notifications generated by mobile communication devices. Such coverage areas may, for example, comprise auditoriums, rooms, buildings, cathedrals, campuses, etc. Again, it is emphasized that though the exemplary system 500 is discussed herein generally in the context of a single wireless transmitter, various aspects of the present invention are readily extensible to multi-transmitter (or, for example, multi-antenna) systems, a non-limiting example of which is illustrated in FIG. 6.

In a non-limiting exemplary scenario, the wireless transmitter 510 may transmit a plurality of wireless RF signals from a plurality of respective antennas to cover a particular coverage area in which it is desired to control characteristics of user notifications generated by mobile communication devices. Also for example, the exemplary system 500 may utilize a plurality of transmitters and/or antennas to transmit a plurality of signals to respective coverage areas. The system 500 may, for example, utilize directional antennas and/or transmission power control to control the respective coverage areas. The respective coverage areas may, in aggregate, provide coverage to an overall desired coverage area.

In general, the wireless transmitter 510 may transmit the wireless signal. Accordingly, the scope of various aspects of the present invention should not be limited by characteristics of any particular signal type, communication standard or protocol, communication medium, or any particular manner of, or mechanism for, transmitting a signal.

The exemplary system 500 is illustrated with a communication interface module 512 (with associated antenna 513) and a general communication control module 522. Such modules may, for example and without limitation, be present in a system that performs various aspects of user notification control and that performs various communication network operations. For example, the exemplary system 500 may also utilize the communication interface module 512 to communicate general communications with mobile communication devices (e.g., cellular phone calls, email messages, video messages, text messages, etc.). For example, the exemplary system 500 may serve as a communication network access point. The general communication module 522 may generally govern operation of the exemplary system 500 with respect to such communications. Accordingly, the scope of various aspects of the present invention should not be limited by characteristics of any particular communication activities that may be performed or by characteristics of any particular components (hardware or software) for performing such communication activities.

The exemplary system 500 may perform any of a large variety of communication related operations. For example and without limitation, the exemplary system 500 may monitor system performance. Also for example, the exemplary system 500 may interface with a user (e.g., utilizing the user interface module(s) 530) to control various operational characteristics of the exemplary system 500. Further for example, the exemplary system 500 may perform various system testing or maintenance activities. Still further for example, the exemplary system 500 may maintain log files of system operation. Also for example, the system 500 may perform general communications with mobile communication devices. The scope of various aspects of the present invention should not be limited by characteristics of any particular operations that a transmitter or transmission system may perform.

The exemplary system 500 was presented to provide specific illustrations of various generally broader aspects of the present invention. Accordingly, the scope of various aspects of the present invention should not be limited by characteristics of the exemplary system 500.

FIG. 6 is a diagram illustrating a system 600 for controlling characteristics of a user notification generated by a mobile communication device, in accordance with various aspects of the present invention. The exemplary system 600 may, for example and without limitation, share various functional characteristics with the exemplary method 400 illustrated in FIG. 4 and discussed previously. Also, the exemplary system 600 may, for example and without limitation, share various characteristics with the exemplary system 500 illustrated in FIG. 5 and discussed previously.

The exemplary system 600 may comprise a plurality of antennas 610, 620, 630 and 640, which radiate respective wireless RF signals in a coverage area 605 where it is desired to control user notification characteristics of mobile communication devices. Such a coverage area may, for example, comprise an auditorium, room, building, cathedral, campus, etc. For example, the first antenna 610 radiates a wireless RF signal having approximately a first signal envelope 611. Similarly, the second, third and fourth antennas 620, 630 and 640 radiate respective wireless RF signals having respective second, third and fourth signal envelopes 621, 631 and 641. Note that the respective signals radiating from the antennas may originate at a single transmitter or a plurality of transmitters.

In the illustrated exemplary scenario, the exemplary system 600 may utilize directional antennas and/or transmission power control to control the transmission of the wireless signals to respective individual coverage areas. The respective coverage areas associated with the antennas 610, 620, 630 and 640 may, in aggregate, cover an entire desired coverage area 605. Note that coverage areas associated with the particular antennas may overlap. For example, the first mobile communication device 691 may receive a wireless signal from either the first antenna 610 or the fourth antenna 640, while the second mobile communication device 692 is presently positioned in the coverage area 605 only within the transmission envelope 631 of the third antenna 630.

The exemplary system 600 was presented to provide specific illustrations of various generally broader aspects of the present invention. Accordingly, the scope of various aspects of the present invention should not be limited by characteristics of the exemplary system 600.

In summary, various aspects of the present invention provide a system and method for controlling user notification characteristics of a mobile communication device. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a mobile communication device, a method for notifying a user about a communication, the method comprising:
   receiving, at the mobile communication device, a control signal from a wireless transmitter, the control signal comprising at least one characteristic specifically adapted to control selection by the mobile communication device of a manner in which the mobile communication device notifies a user of a communication;
   selecting, based at least in part on the at least one characteristic of the received control signal, at least one user notification characteristic wherein said selection is based on a notification profile maintained in the mobile communication device;
   after receiving the control signal, receiving, at the mobile communication device, a communication from a communication network; and
   in response to the received communication, generating a user notification to notify a user about the received communication, where the user notification is characterized, at least in part, by the selected at least one user notification characteristic.

2. The method of claim 1, wherein receiving a control signal from a wireless transmitter comprises receiving a wireless control signal that mimics a wireless signal from the communication network.

3. The method of claim 1, wherein receiving a control signal from a wireless transmitter comprises receiving the control signal from a transmitter that is independent of the communication network.

4. The method of claim 1, wherein the at least one characteristic of the received control signal comprises information communicated by the received control signal.

5. The method of claim 1, wherein the at least one user notification characteristic comprises at least one of: a vibration characteristic and/or a ring tone characteristic.

6. The method of claim 1, further comprising determining, based at least in part on the at least one characteristic of the received control signal, to route the received communication to a mailbox.

7. The method of claim 1, wherein selecting at least one user notification characteristic comprises selecting the at least one user notification characteristic based, at least in part, on a notification profile.

8. The method of claim 7, wherein the notification profile comprises information regarding whether the mobile communication device is enabled to perform automated user notification characteristic selection.

9. The method of claim 7, wherein the notification profile comprises information identifying a source of the received signal for which automated selection of user notification characteristics is enabled.

10. The method of claim 1, wherein receiving a communication from a communication network comprises receiving a cellular telephone call.

11. The method of claim 1, further comprising, after selecting at least one user notification characteristic, detecting a change in the received control signal and selecting, based at least in part on the detected change, at least one next user notification characteristic.

12. The method of claim 1, further comprising, when a user notification characteristic is automatically changed, generating a user output notifying a user of the mobile communication device that the user notification characteristic has been automatically changed in response to the received control signal from the wireless transmitter.

13. The method of claim 1, further comprising determining, based at least in part on a characteristic of the received control signal, to operate the mobile communication device in a silent communication mode that allows a user to select one or more prerecorded audible messages for communication from the mobile communication device to a source of the received communication.

14. A mobile communication device, comprising:
   at least one module operable to, at least:
      receive a control signal from a wireless transmitter, the control signal comprising at least one characteristic specifically adapted to control selection by the mobile communication device of a manner in which the mobile communication device notifies a user of a communication;
      select, based at least in part on the at least one characteristic of the control signal received from the wireless transmitter, at least one user notification characteristic wherein said selection is based on a notification profile maintained in the mobile communication device;
      after the control signal is received, receive a communication from a communication network; and
      in response to the received communication, generate a user notification to notify a user about the received communication, where the user notification is characterized, at least in part, by the selected at least one user notification characteristic.

15. The mobile communication device of claim 14, where the wireless transmitter is independent of the communication network.

16. The mobile communication device of claim 14, where the at least one characteristic of the control signal received from the wireless transmitter comprises information communicated by the received control signal.

17. The mobile communication device of claim 14, where the at least one user notification characteristic comprises at least one of: a vibration characteristic and/or a ring tone characteristic.

18. The mobile communication device of claim 14, wherein the at least one module is operable to select the at least one user notification characteristic based, at least in part, on a notification profile.

19. The mobile communication device of claim 18, wherein the notification profile comprises information regarding whether the mobile communication device is enabled to perform automated user notification characteristic selection.

20. The mobile communication device of claim 18, wherein the notification profile comprises information identifying a source of the received signal for which automated selection of user notification characteristics is enabled.

21. The mobile communication device of claim 14, where the communication network comprises a cellular telephone communication network.

22. The mobile communication device of claim 14, wherein the at least one module is operable to, when a user notification characteristic is automatically changed, generate a user output notifying a user of the mobile communication device that the user notification characteristic has been automatically changed in response to the received control signal from the wireless transmitter.

23. The mobile communication device of claim 14, wherein the at least one module is operable to receive a control signal from the wireless transmitter by, at least in part, operating to receiving a wireless control signal that mimics a wireless signal from the communication network.

24. The mobile communication device of claim 14, wherein the at least one module is operable to determine, based at least in part on the at least one characteristic of the received control signal, to route the received communication to a mailbox.

25. The mobile communication device of claim 14, wherein the at least one module is operable to, after operating to select at least one user notification characteristic, detect a change in the received control signal and select, based at least in part on the detected change, at least one next user notification characteristic.

26. The mobile communication device of claim 14, wherein the at least one module is operable to determine, based at least in part on a characteristic of the received control signal, to operate the mobile communication device in a silent communication mode that allows a user to select one or more prerecorded audible messages for communication from the mobile communication device to a source of the received communication.

* * * * *